(12) United States Patent
Morrish

(10) Patent No.: US 6,208,094 B1
(45) Date of Patent: Mar. 27, 2001

(54) MULTIPLEXED VIDEO INTERFACE SYSTEM

(75) Inventor: Andy Morrish, Saratoga, CA (US)

(73) Assignee: National Semiconductor Corp., Santa Clara, CA (US)

( * ) Notice: Subject to any disclaimer, the term of this patent is extended or adjusted under 35 U.S.C. 154(b) by 0 days.

(21) Appl. No.: 09/271,027

(22) Filed: Mar. 17, 1999

(51) Int. Cl.[7] ....................................................... G09G 1/04
(52) U.S. Cl. ............................................. 315/383; 315/379
(58) Field of Search .................................... 315/383, 384, 315/386, 387, 388, 399, 379; 348/379–382

(56) References Cited

U.S. PATENT DOCUMENTS

| 3,750,038 | * | 7/1973 | Meise et al. | 330/11 |
| 4,218,706 | * | 8/1980 | Brinegar et al. | 358/172 |
| 5,870,139 | * | 2/1999 | Cooper et al. | 348/159 |

* cited by examiner

*Primary Examiner*—Don Wong
*Assistant Examiner*—Hoang Nguyen
(74) *Attorney, Agent, or Firm*—Stallman & Pollock LLP

(57) ABSTRACT

A multiplexed video amplifier circuit includes a video preamplifier and a bias/brightness circuit the output of both being coupled to a switch. The video preamplifier provides a video signal, the bias/brightness circuit provides a DC bias signal, and the switch selectively couples to the output of either the video preamplifier or the bias/brightness circuit. In this way, the switch alternately receives the video signal and the DC bias signal and combines them to provide a single multiplexed video signal with both video and DC bias signal data. This multiplexed video signal is sent to a clamp amplifier and a video amplifier, both of which compare the magnitude of the multiplexed video signal with a reference signal. When the magnitude of the multiplexed video signal transcends the reference signal in a first direction, for example is lower than the reference signal, the clamp amplifier provides the DC bias signal to an external circuit. In contrast, when the magnitude of the multiplexed signal transcends the reference signal in a second direction, for example is greater than the reference signal, the video amplifier amplifies the video signal and provides it to the external circuit.

18 Claims, 8 Drawing Sheets

MULTIPLEXED VIDEO INTERFACE SYSTEM

BACKGROUND OF THE INVENTION

1. Technical Field of the Invention

The invention relates generally to CRT (cathode ray tube) video monitors in computer systems, and in particular, to a multiplexed video interface system.

2. Description of the Related Art

A computer system essentially comprises a system unit housing a microprocessor, computer memory, and various other support logic, as well as various input/output (I/O) devices which are connected to the system unit and enable a user to intelligently interact with the system unit. Examples of various types of input devices include a keyboard, a mouse, a trackball, and a pen computer, as well as others. The primary output device in a computer system include a video display monitor (video monitor).

Video monitors, such as for use with digital computers, include a cathode ray tube (CRT), and driver circuitry including a video amplifier. The CRT includes three primary color cathode ray guns which are manipulated to converge on a screen that produces the color image. The three guns produce converged scanning rasters having red, green and blue fields which combine to produce white light. The typical scanning raster is a left to right horizontal and top to bottom vertical scan operated in accordance with the Video Electronics Standards Association (VESA) requirements.

A conventional monitor amplifier circuit 100 for displaying screen control states of a monitor is illustrated in FIG. 1. In general, low level color video signals blue b, red r, and green g from a video source (not shown), such as a personal computer (PC) are provided to respective video preamplifiers 101a, 101b and 101c. These preamplifiers in turn provide the respective video signals blue b, red r, and green g, via buffer amplifiers BUFF11, BUFF12, BUFF13, to video output driver stages 103a, 103b, 103c which supply high level amplified color video signals B, R and G to respective cathode intensity control electrodes of a CRT (not shown). As can be seen, in FIG. 1, each video signal blue b, red r, and green g is applied to a respective amplifier circuit AMP11–AMP13, each of which includes four main components: a video preamplifier 101a–101c, a bias/brightness circuit 105a–105c, a video amplifier 103a–103c, and a clamp amplifier 107a–107c. Since the monitor amplifier circuits AMP11–AMP13 are identical in structure and operation, only the circuit operation of amplifier circuit AMP12 for the red video signal r will be discussed by referring to FIG. 2.

As can be seen in FIG. 2, the four main components of monitor amplifier circuit AMP12 are numbered 1–4, number 1 being bias/brightness circuit 105b, number 2 being video preamplifier 101b, number 3 being clamp amplifier 107b, and number 4 being video amplifier 103b.

Operation of this red video channel r is as follows. Terminal 10 constitutes the red video signal input r which originates from an external source, such as a PC. Capacitor CAP12 couples the red video signal r to the non-inverting input of video preamplifier 101b.

At this point, the amplification of red video signal r is controlled by a single-throw switch SW12 and a video clamp pulse VC. In any video signal, the clamp pulses are developed just following the synchronization pulses and make it possible to restore the voltage reference level of a video signal, in this case red video signal r. This clamp pulse VC is located in the "back porch" of the composite red video signal r and is employed to operate switch SW12. When clamp pulse VC is high, switch SW12 is closed. Thus, each time the CRT scans a horizontal line, capacitor CAP12 will be charged to black level reference voltage VREF, which is the potential reference level of the black region of an image. This level corresponding to the black color in an image makes it possible to restore the potential reference level of the red video signal r, this level having disappeared on account of the presence of the input capacitor CAP12.

On the other hand, when video clamp pulse VC is low, switch SW12 opens and red video signal r is applied directly to video preamplifier 101b, which is shown in FIG. 2 as a unity gain amplifier. Thus, red video signal r is passed through video preamplifier 101b.

At this point, the amplification of red video signal r is controlled by double-throw switch SW14 and signal 11. Signal 11 represents a horizontal blanking pulse that is derived from the display scanning circuits in a manner well known in video display monitors. This signal 11 is employed to operate a double-throw switch SW14 which switches the input IN12 to output buffer BUFF12, between the output of video preamplifier 101b and circuit ground. When signal 11 is high, input IN12 couples to video preamplifier 101b, the output of which is inversely amplified by video amplifier 103b to a voltage level suitable for driving a CRT and then applied to cathode electrodes of the CRT. On the other hand, when signal 11 is low, input IN12 is at circuit ground and the CRT is blanked by driving the output of the video amplifier 103b to a high level.

During operation of this amplifier circuit AMP12, output coupling capacitor CAP 22 changes the DC level at the CRT cathode. Thus, a bias clamp circuit 105b is used to restore the DC level at the CRT cathode through a series diode D11. Bias clamp circuit 105b outputs a bias clamp DC voltage which, in a typical video monitor, is usually factory set. This bias clamp voltage reinstates the charge on output capacitor CAP22 only during the blanking period. The voltage is preset, typically, in the range of 100–140 volts to compensate for differences in CRT cathode bias levels, required by each cathode in the CRT to set the black level. In addition, an adjustable voltage component of typically +/−10 volts may be added to this bias level to accomplish the 'brightness' feature, such that the black level can be manually adjusted by an external source. Thus, for example, increased image brightness results when the bias clamp voltage is reduced. This results in a less positive DC bias potential at the red cathode and a related increase in image brightness.

Although the conventional monitor amplifier system 100 amplifies and conditions video signals to drive the CRT, there are several disadvantages to the circuit configuration. Referring again to FIG. 1, it can be seen that this architecture involves a significant number of interconnections. Such a low level of integration has several disadvantages. First, the circuit architecture requires a large printed circuit board (PCB), yielding higher design costs due to shielding for the radio frequency (RF) interface. Second, the conventional circuit architecture has inferior high frequency performance due to long interconnection traces between the components and due to electromagnetic interference (EMI) stemming from long signal lines and large signal swings across the video interface between each preamplifier 101a–101c and corresponding video amplifier 103a–103c. Third, the high number of interconnections require higher pin count packages which are undesirably large and expensive. Finally, the complexity of the system 100 due to the low level of integration results in longer design time.

Thus, a need exists for a monitor amplifier system with a simplified architecture having a high level of integration.

SUMMARY OF THE INVENTION

A multiplexed video amplifier circuit includes a video preamplifier and a bias/brightness circuit, the output of both being coupled to a switch. The video preamplifier provides a video signal, the bias/brightness circuit provides a DC bias signal, and the switch selectively couples to the output of either the video preamplifier or the bias/brightness circuit in response to a horizontal blanking pulse. In this way, the switch alternately receives the video signal and the DC bias signal and combines them to provide a single multiplexed video signal with both video and DC bias signal data. This multiplexed video signal is sent to a clamp amplifier and a video amplifier, both of which compare the magnitude of the multiplexed video signal with a reference signal. When the magnitude of the multiplexed video signal transcends the reference signal in a first direction, for example is lower than the reference signal, the clamp amplifier provides the DC bias signal to an external circuit. In contrast, when the magnitude of the multiplexed signal transcends the reference signal in a second direction, for example is greater than the reference signal, the video amplifier amplifies the video signal and provides it to the external circuit.

In another embodiment of the present invention, the video preamplifier and the bias/brightness circuit are integrated into a single circuit. In addition, the clamp and video amplifiers are also integrated into a single circuit.

In yet another embodiment of the present invention, the multiplexed video amplifier circuit includes a feedback amplifier circuit which couples to the output of the video preamplifier. The feedback amplifier receives both the DC bias signal and the reference signal and outputs a feedback signal to the video preamplifier when the two signals are unequal. In this way, the feedback amplifier can compensate for any DC offset in the video preamplifier.

These and other features and advantages of the present invention will be understood upon consideration of the following detailed description of the invention and the accompanying drawings.

DETAILED DESCRIPTION OF THE PREFERRED EMBODIMENT

Figure 3A:
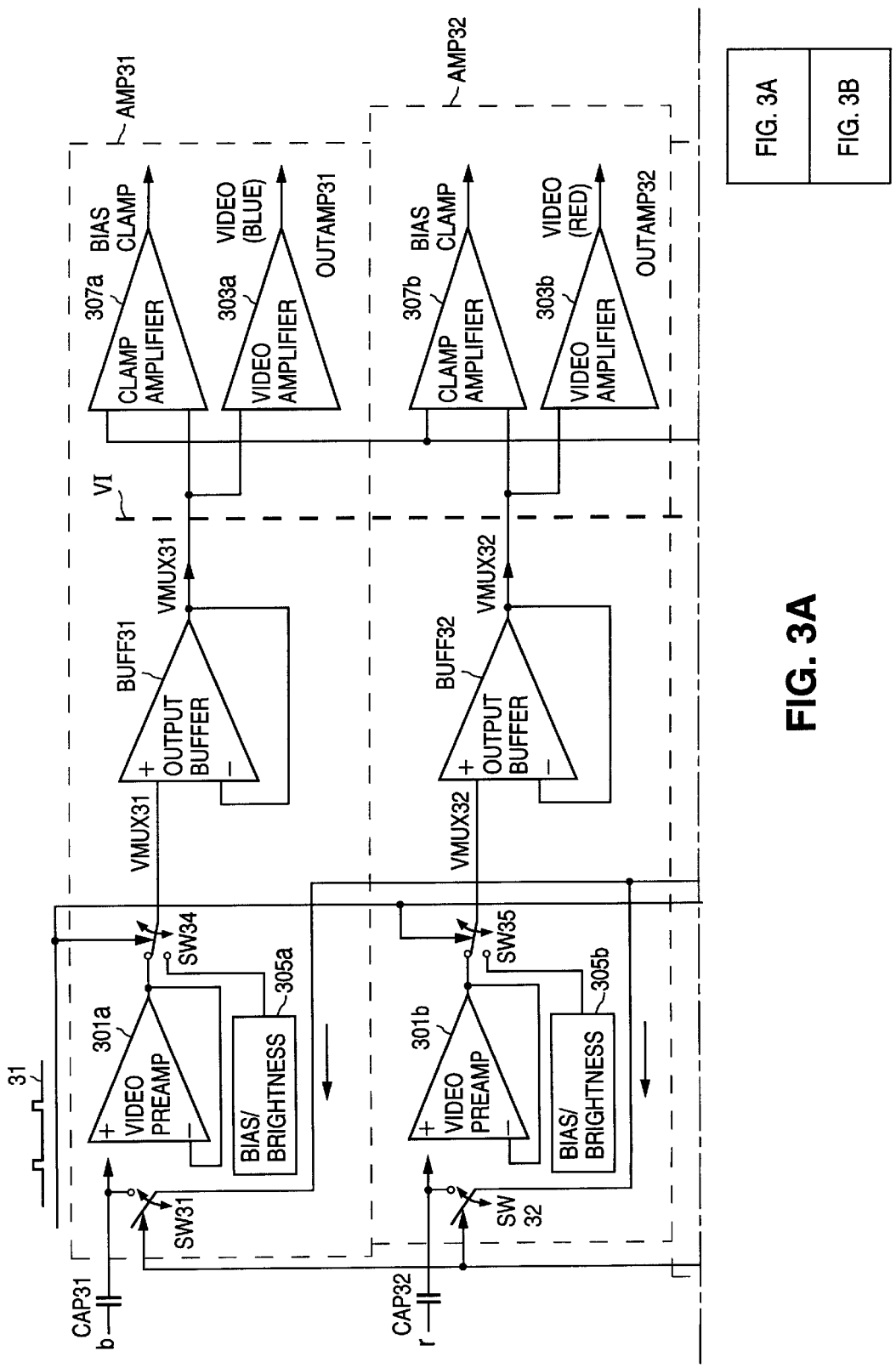
FIG. 3 illustrates a multiplexed video interface system in accordance with one embodiment of the present invention.
Figure 3B:
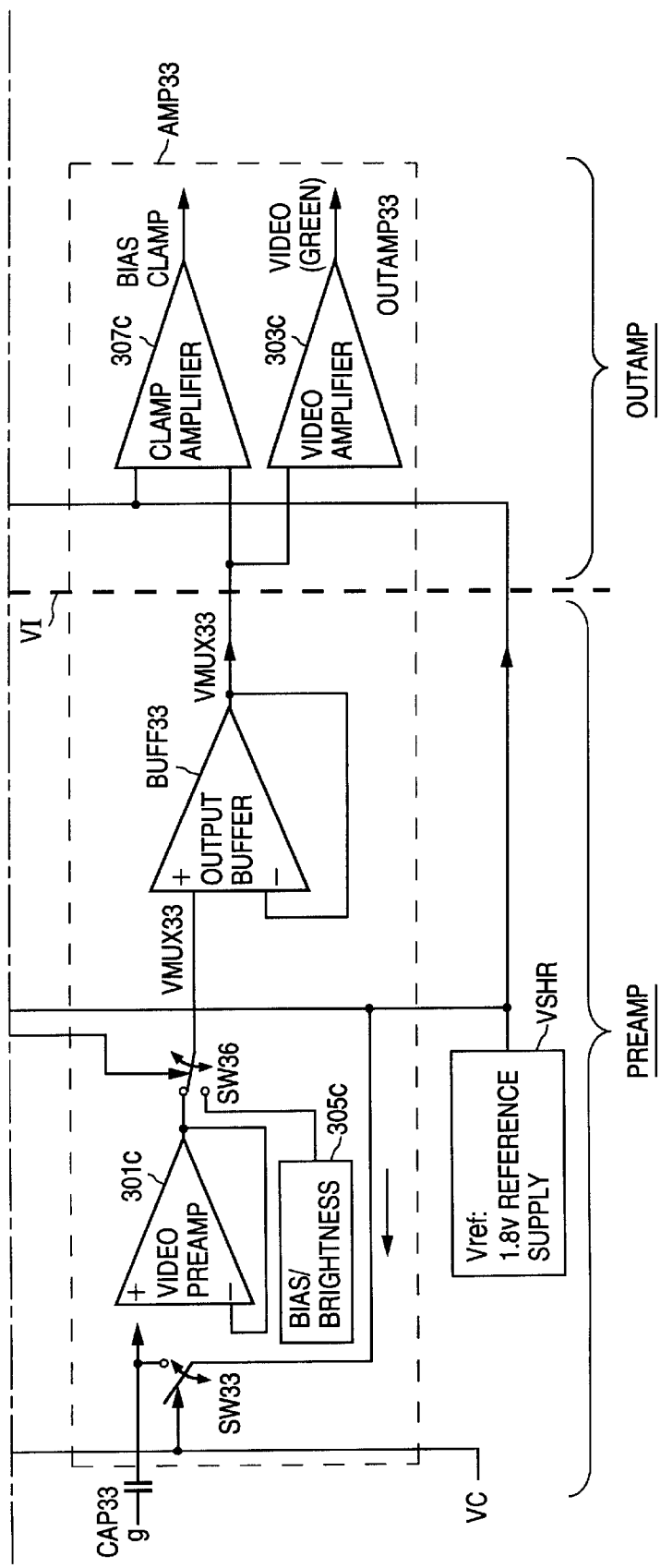

Referring now to FIG. 3, the multiplexed video interface system 300 includes a monitor amplifier circuit AMP31–AMP33 for each video signal blue b, red r, and green g, and reduces the problems of the conventional monitor amplifier system 100. By integrating several of the components, multiplexed video interface system 300 can be constructed using only two integrated circuits (ICs)—a preamplifier circuit PREAMP and an output amplifier circuit OUTAMP. In an exemplary embodiment, preamplifier circuit PREAMP includes video preamplifiers 301a–301c and bias/brightness circuits 305–305c for each video signal blue b, red r, and green g, as well as switches SW31–SW36 and shared reference supply VSHR. It will be appreciated that although output buffers BUFF31–BUFF33 are illustrated in FIG. 3, such use of output buffers BUFF31–BUFF33 is optional. If output buffers BUFF31–BUFF33 are used, they too may be integrated into preamplifier circuit PREAMP. In another exemplary embodiment, output amplifier OUTAMP includes video amplifiers 303a–303c and clamp amplifiers 307a–307c for each video signal blue b, red r, and green g.

For exemplary purposes only video interface system 300 has been divided into amplifier circuits AMP31–AMP33. Since the amplifier circuits AMP31–AMP33 are identical in structure and operation, only the circuit operation of amplifier circuit AMP32 for the red video signal r will be discussed by referring to FIG. 4.

Figure 4:
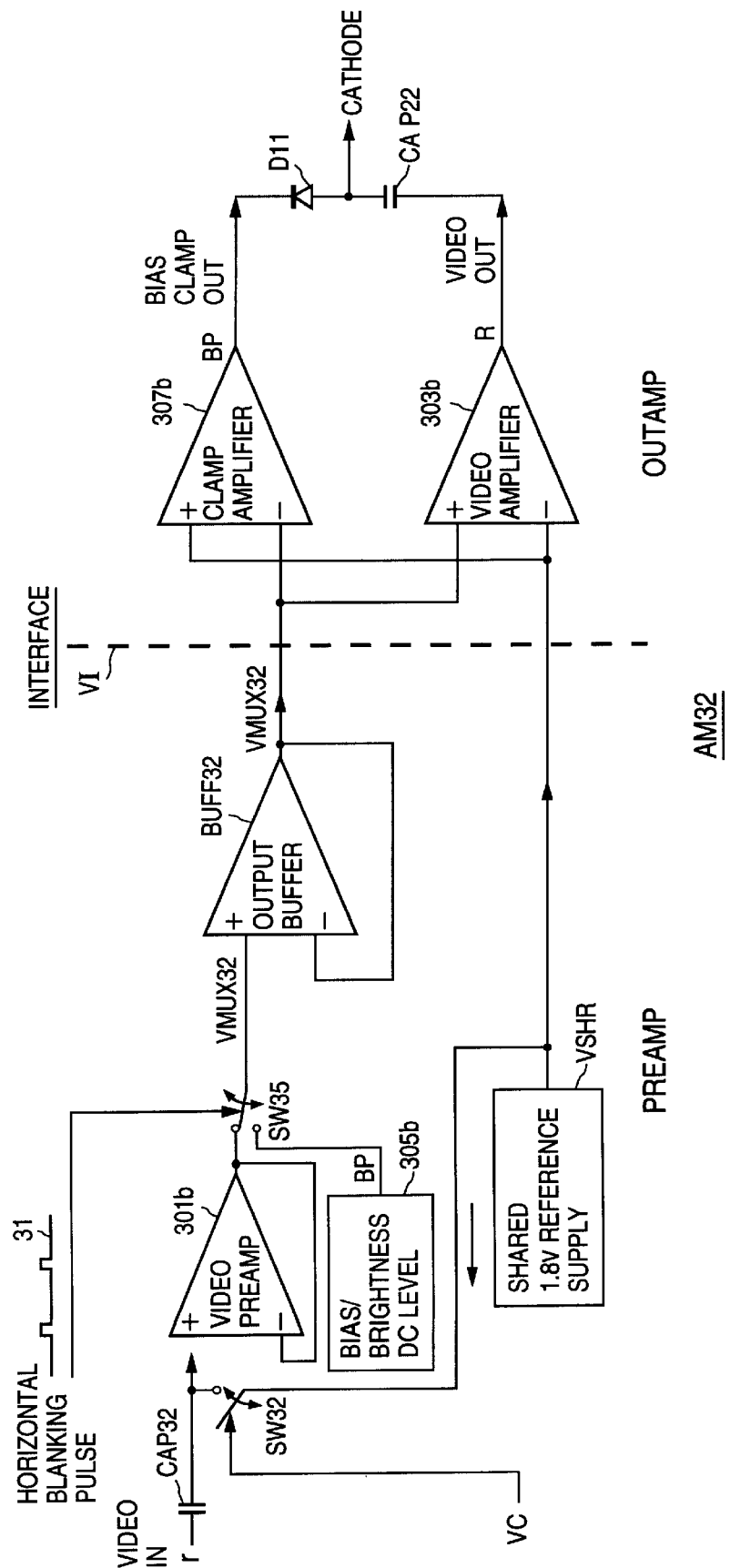
FIG. 4 illustrates one channel of the multiplexed video interface system illustrated in FIG. 3, in accordance with one embodiment of the present invention.

As illustrated in FIG. 4, and as indicated above, amplification circuit AMP32 includes preamplifier circuit PREAMP and output amplifier circuit OUTAMP. To control the signal communication between preamplifier circuit PREAMP and output amplifier circuit OUTAMP, multiplexed video interface system 300 uses a video interface VI with a low level of complexity. Such video interface VI defines a process in which the red video signal r, output from video preamplifier 301b, and a variable direct current (DC) blank pulse BP are multiplexed into a single signal, buffered by buffer amplifier BUFF32, and sent to output amplifier OUTAMP.

Figure 5:
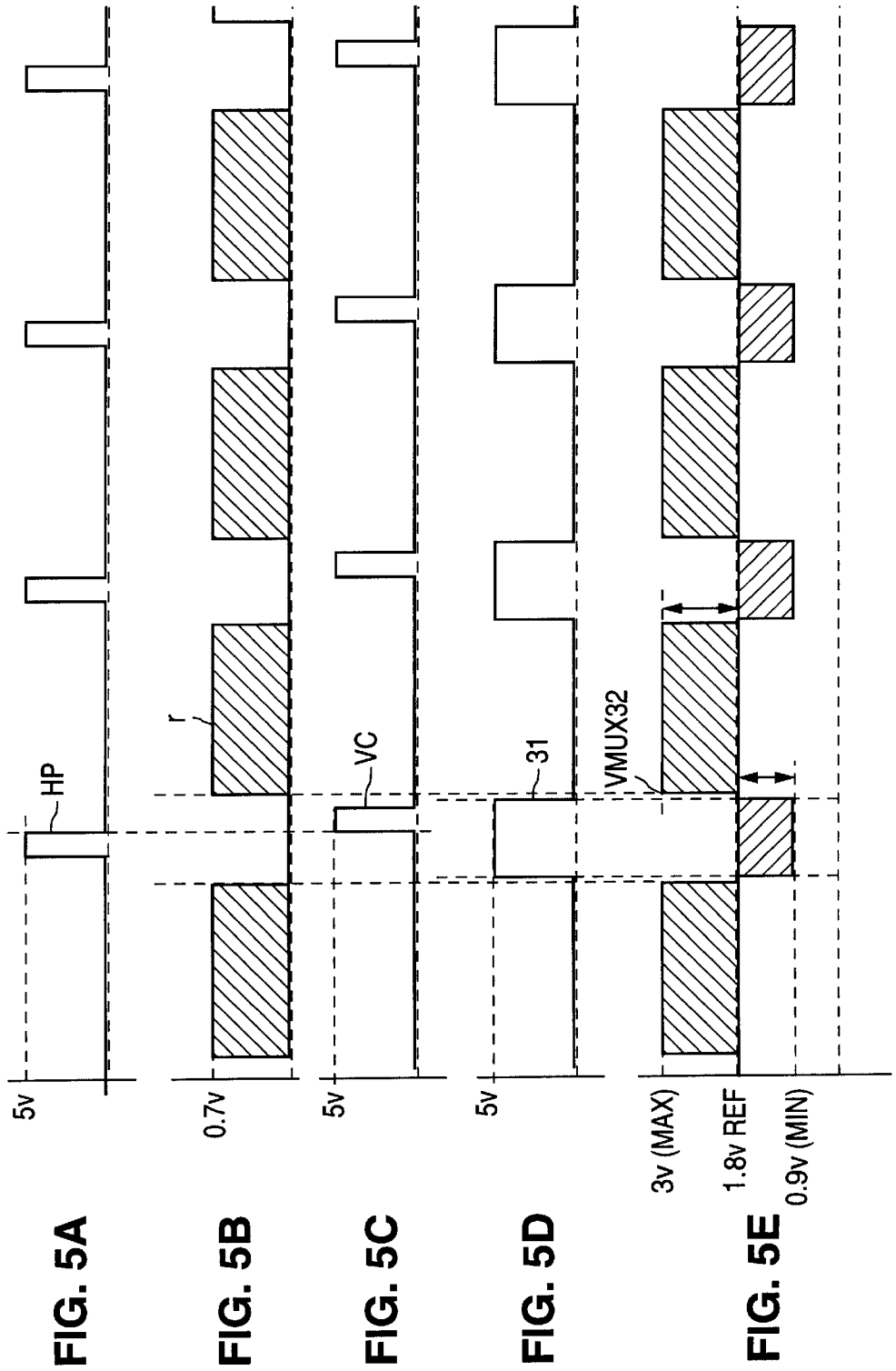
FIGS. 5A–5E illustrate signaling diagrams of the multiplexed video interface system in accordance with the present invention.

The operation of multiplexed video interface system 300 illustrated in FIG. 4, is best explained in conjunction with the signal diagrams illustrated in FIGS. 5A–5E. Beginning with the preamplifier circuit PREAMP side of the multiplexed video interface system 300 as shown in FIG. 4, the amplification of red video signal r is controlled by a video clamp pulse VC and a single-throw switch SW32. FIG. 5C illustrates the clamp pulse VC, which develops just following the horizontal synchronous pulse HP, as illustrated in FIG. 5A.

Referring again to FIG. 4, when clamp pulse VC is high, switch SW32 is closed and a shared voltage reference VSHR is coupled to the non-inverting input of video preamplifier 301b and to capacitor CAP32. This shared voltage reference VSHR is the potential reference level of the black region of an image. Thus, each time the CRT scans a horizontal line, capacitor CAP32 is charged to the black level reference voltage from shared reference voltage VSHR. In an exemplary embodiment, the shared reference voltage VSHR is 1.8 volts (V). Thus, since there is no red video signal r during the time that clamp pulse VC is high, as shown in FIG. 5B, and since video preamplifier 301b is DC coupled from input to output, an input black level voltage of 1.8V causes an output black level voltage of 1.8V. It will be appreciated that although video preamplifier 301b is illustrated as a unity gain amplifier, video preamplifier 301b may also be an increasing, decreasing or variable gain amplifier.

Figure 6:
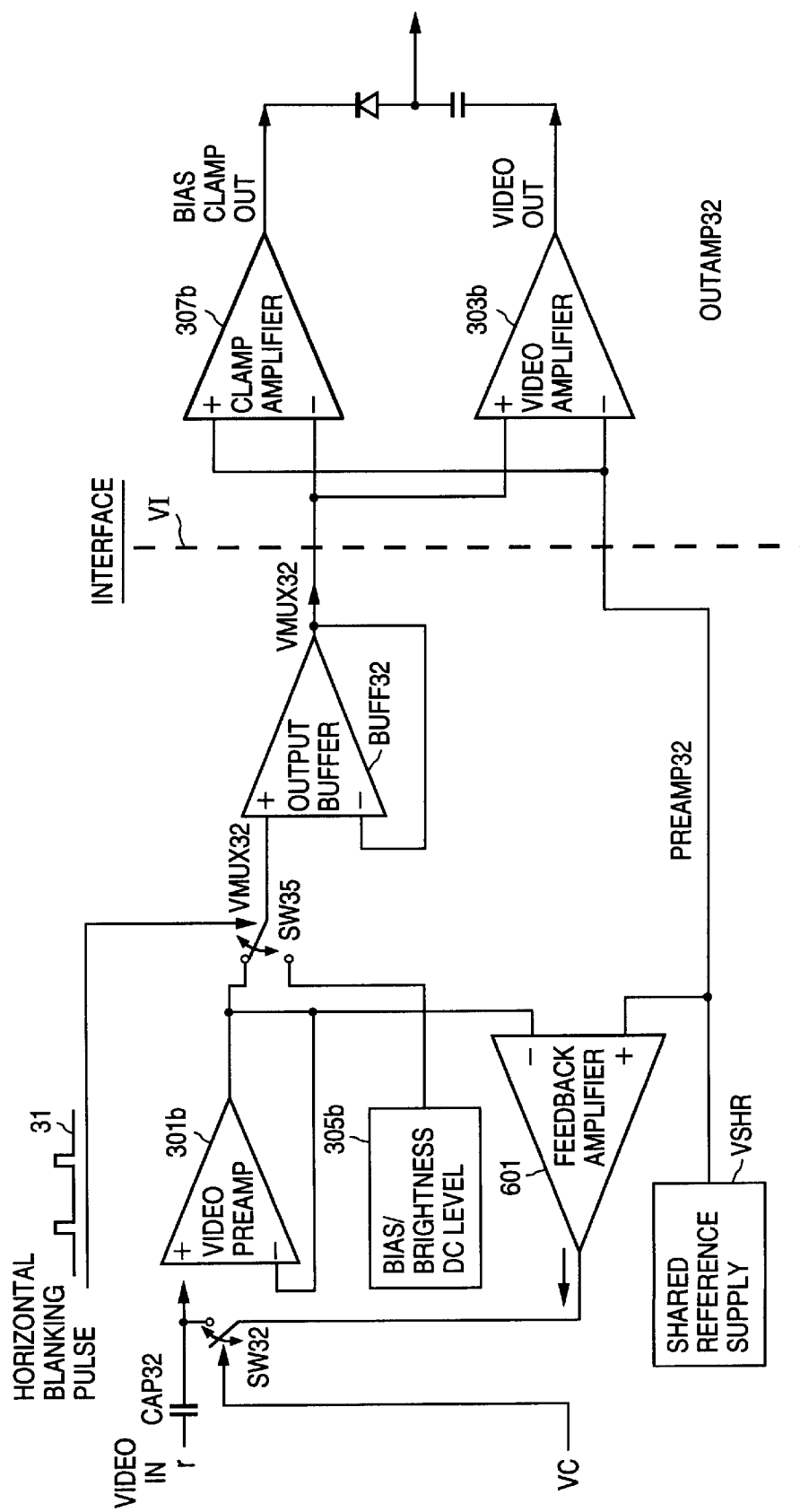
FIG. 6 illustrates one channel of a multiplexed video system in accordance with another embodiment of the present invention.

FIG. 6 illustrates an alternate embodiment of the present invention in which preamplifier circuit PREAMP includes a feedback circuit 601. This exemplary embodiment includes a feedback circuit 601 which is an operational amplifier having an inverting input coupled to the output of video preamplifier 301b, a non-inverting input coupled to the shared reference supply VSHR, and an output coupled to switch SW32. In this way, feedback circuit 601, can be used within the clamp system to ensure the black level output by video preamplifier 301b during the clamp period (i.e., the period in which the clamp pulse VC signal is high) is 1.8 V in order to eliminate any DC offsets that may be present in video preamplifier 301b.

Referring now to FIG. 4 and FIG. 5C, when video clamp pulse VC is low, switch SW32 opens and red video input signal r is applied directly to video preamplifier 301b. The red video signal r is amplified by, or passed through, the video preamplifier 301b, depending upon whether preamplifier 301b is an increasing, decreasing, unity or variable gain amplifier. In this exemplary embodiment since preamplifier 301b is a unity gain amplifier, the red output video signal is the same as the red input video signal r. This red output video signal r is then applied to one pole of a double pole switch SW35, which is controlled by a signal 31.

Signal 31, illustrated in FIG. 5D, represents a horizontal blanking pulse which operates the double-throw switch SW35. In a conventional monitor amplifier system 100 (FIG. 1), double-throw switch SW14 was switching between the output of video preamplifier 101b and circuit ground. In contrast, double-throw switch SW35 switches between the output of video preamplifier 301b and bias/brightness circuit 305b. In this way, horizontal blanking pulse 31 controls whether the red output video signal r, illustrated in FIG. 5B, or a variable DC blank pulse BP, is input to output buffer BUFF32. Again, it will be appreciated that the use of output buffer BUFF32 in amplifier circuit AMP32 is optional. In addition, although output buffer BUFF32 is illustrated as a unity gain amplifier, it will be appreciated that output buffer BUFF32 may also be an increasing, decreasing or variable gain amplifier.

When horizontal blanking pulse 31 is high, switch SW35 couples to the output of video preamplifier 301b to conduct the red output voltage signal r. When horizontal blanking pulse 31 is low, switch SW35 couples to bias/brightness circuit 305b to conduct variable DC blank pulse BP. Both signals, red output video signal r and variable DC blank pulse BP, are multiplexed to form a multiplexed signal VMUX32 and as illustrated in FIG. 5E, buffered by output buffer BUFF32 and sent to output amplifier OUTAMP.

Although the processing of a single red output video signal r has been described, it will be appreciated that On Screen Display (OSD) video information may also be multiplexed with the red output video signal r information in the video preamplifier PREAMP stage. Also, video from any other alternative source, such as when two sources of video information are used, may be mixed and viewed on one screen.

Figure 7:
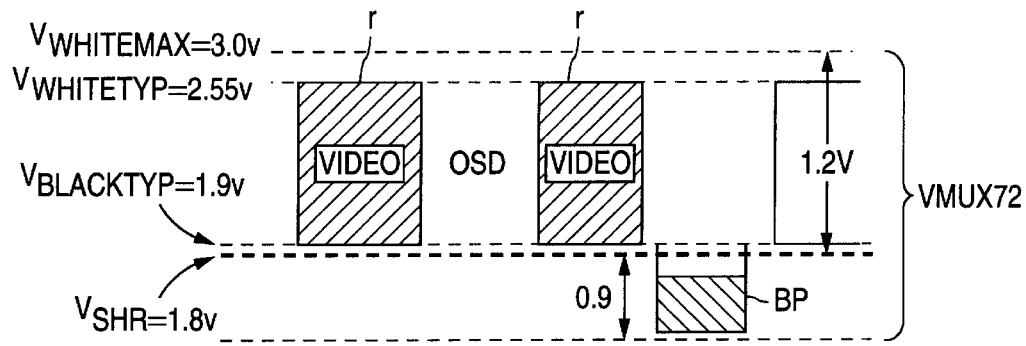
FIG. 7 illustrates a signaling diagram of a multiplexed video signal of the multiplexed video interface system in accordance with the present invention.

On the output amplifier OUTAMP side of video interface VI, multiplexed signal VMUX is de-multiplexed into its respective red output video signal r and variable DC blank pulse BP. This de-multiplexing operation is explained in conjunction with FIG. 4, and FIG. 7 which illustrates exemplary voltage levels of a multiplexed signal VMUX72 including on screen display (OSD) data, red output video signal r data and a variable DC blank pulse BP. As illustrated in FIG. 7, in this exemplary embodiment, the shared reference voltage VSHR is 1.8V. Although the voltage level of applied red output video signal r can range from 1.8–3.0V, the typical black voltage level VBLACKTYP is between 1.8–1.9V. In addition, the typical white voltage level VWHITETYP is between 2.55–3.0V. Thus, typically red output video signal r ranges in magnitude from 1.9–2.55V. The voltage level of variable DC blank pulse BP, which is a variable amplitude signal, typically is between 0.9–1.8V. Thus, signals having voltage levels greater than 1.8V correspond to red output video signals r, and signals having voltage levels less than 1.8 V correspond to variable DC blank pulses BP. Using this formula, output amplifier OUTAMP of FIG. 4 can properly process both red output video signals r and variable DC blank pulses BP.

Shared reference voltage VSHR, in addition to being input into video preamplifier 301b, is applied to the inverting input of video amplifier 303b and the non-inverting input of clamp amplifier 307b. It will also be appreciated that, referring again to FIG. 3, shared reference voltage VSHR is input into each preamplifier 301a–301c, each inverting input of video amplifier 303a–303c, and each non-inverting input of clamp amplifier 307a–307c. Referring again to FIG. 4, as indicated above, a comparison of this shared reference voltage VSHR, will determine which of the two amplifiers 303b, 307b process red output video signal r, and which of the two amplifiers 303b, 307b process variable DC blank pulse BP.

Video amplifier 303b receives multiplexed signal VMUX32 at the non-inverting input and shared reference voltage VSHR at the inverting input. When the magnitude or signal level of multiplexed signal VMUX transcends shared reference voltage VSHR in a first direction, for example, is greater than shared reference voltage VSHR, which is 1.8V in this example, video amplifier 303b amplifies this signal portion of the multiplexed signal VMUX32 to provide an amplified red video signal R. When the signal level of multiplexed signal VMUX32 transcends shared reference voltage VSHR in a second direction, for example, is less than shared reference voltage VSHR, video amplifier 303b is in saturation and therefore, inactive. In this way, only red output video signal r, which is greater than 1.8V, is amplified by video amplifier 303b and sent to the CRT cathode.

In contrast, clamp amplifier 307b receives the multiplexed signal VMUX32 at the inverting input and shared reference voltage VSHR at the non-inverting input. When the signal level of multiplexed signal VMUX32 transcends shared reference voltage VSHR in a first direction, for example, is greater than shared reference voltage VSHR, clamp amplifier 307b is in saturation and therefore, inactive. When the signal level of multiplexed signal VMUX32 transcends shared reference voltage VSHR in a second direction, for example, is less than shared reference voltage VSHR, clamp amplifier 307b amplifies this signal portion of the multiplexed signal VMUX32. In this way, only the variable DC blank pulse BP, which is less than 1.8V, is output from clamp amplifier 307b and sent to the CRT cathode.

Referring again to FIG. 3, each of the other amplifiers circuits AMP31 and AMP33 operate like amplifier circuit AMP32, to amplify blue video signal b and green video signal g, respectively. In particular, amplifier circuit AMP31 includes video preamplifier 301a, bias/brightness circuit 305a, video amplifier 303a, clamp amplifier 307a, and optionally buffer amplifier BUFF31. Similarly, amplifier circuit AMP33 includes video preamplifier 301c, bias/brightness circuit 305c, video amplifier 303c, clamp amplifier 307c, and optionally buffer amplifier BUFF33. In an exemplary embodiment video preamplifiers 301a, 301c and bias/brightness circuits 305a, 305c are integrated with video preamplifier 301b, 305b in preamplifier circuit PREAMP. If used, buffer amplifiers BUFF31–BUFF33 are also integrated into preamplifier circuit PREAMP. Clamp amplifiers 307a, 307c and video amplifiers 303a, 303c are integrated with clamp and video amplifiers 307b, 303b in output amplifier circuit OUTAMP.

The amplification of both the blue and green video signals b, g is controlled by video clamp pulse VC and corresponding single-throw switch SW31, SW33. Thus, when clamp pulse VC is high, switches SW31, SW33 close to charge the respective capacitor CAP31, CAP33 while the corresponding video preamplifier 301a, 301c outputs the black level voltage of shared reference voltage VSHR. On the other hand, when clamp pulse VC is low, the blue and green video signals b, g pass through the video preamplifiers 301a, 301c, respectively.

Similar to operation of amplifier circuit AMP32, horizontal blanking pulse 31 controls double-throw switches SW34 and SW36, to switch between video preamplifier 301a, 301c and bias/brightness circuit 305a, 305c. For example, the switching operation by switch SW34, causes blue video signal b to be mixed with the output from bias/brightness circuit 305a, which is a variable DC blank pulse BP, resulting in a multiplexed signal VMUX31 which is sent to output amplifier circuit OUTAMP. Similarly, the switching operation by switch SW36 causes the green video signal g to be mixed with the output signal from bias/brightness circuit 305c, which is also a variable DC blank pulse BP, forming a multiplexed signal VMUX33 which is sent to output amplifier circuit OUTAMP.

Clamp and video amplifiers 307a, 307c, 303a, 303c of output amplifier circuit OUTAMP de-multiplex the multiplexed signals VMUX31, VMUX33 in the same way as clamp and video amplifiers 307b, 303b to provide the amplified video signals B, G and variable DC blank pulses to the CRT cathode.

Figure 8:
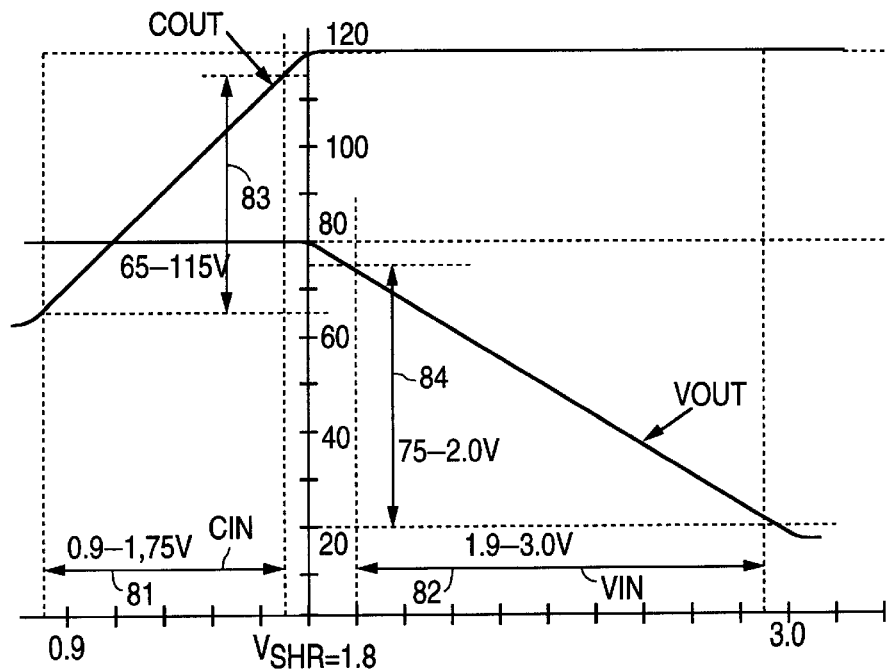
FIG. 8 illustrates a DC input/output (I/O) transfer characteristic for video and clamp amplifiers in accordance with the present invention.

Referring now to FIG. 8, an exemplary DC input/output (I/O) transfer characteristic for video and clamp amplifiers 303b, 307b is shown. In this embodiment, shared reference voltage VSHR is again 1.8V, voltage supply VCC1 for video amplifier 303b is 80V, and voltage supply VCC2 for the clamp amplifier 307b is 120V. The x-axis represents the input voltage amplitude of multiplexed signal VMUX32. The y-axis represents the output voltage of signals from video and clamp amplifiers 303b, 307b. In this example, the active clamp dynamic input range CIN for clamp amplifier 307b is 0.9–1.75V, as illustrated by double arrow 81, whereas the active dynamic video input range VIN for video amplifier 303b is 1.9–3.0V, as illustrated by double arrow 82. The active clamp dynamic output COUT range for clamp amplifier 307b is 65–115V, as illustrated by double arrow 83, whereas the active video dynamic output VOUT range for video amplifier 303b is 75–20V, as illustrated by double arrow 84.

Figure 1:
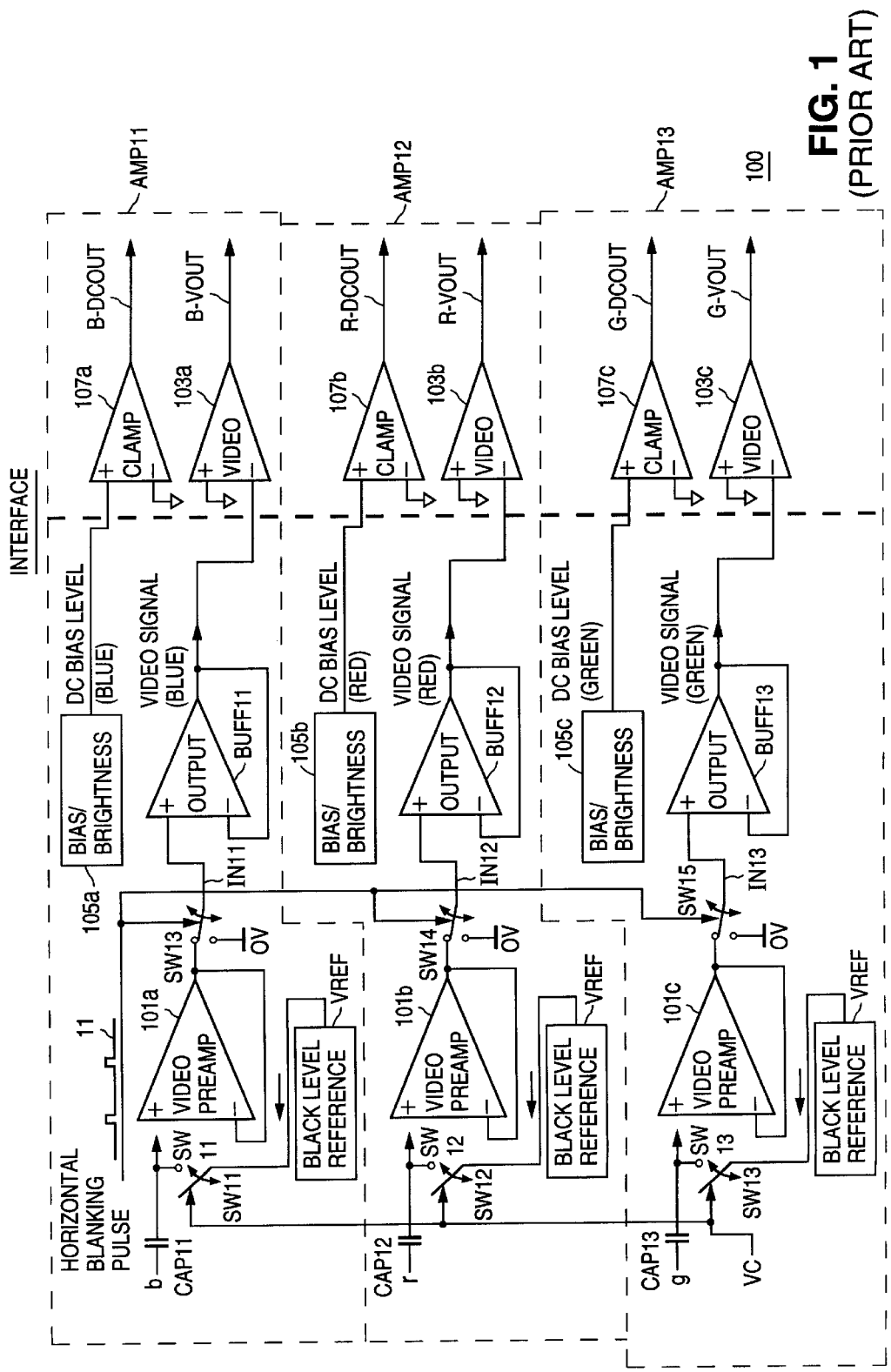
FIG. 1 illustrates a conventional monitor amplifier circuit.
Figure 2:
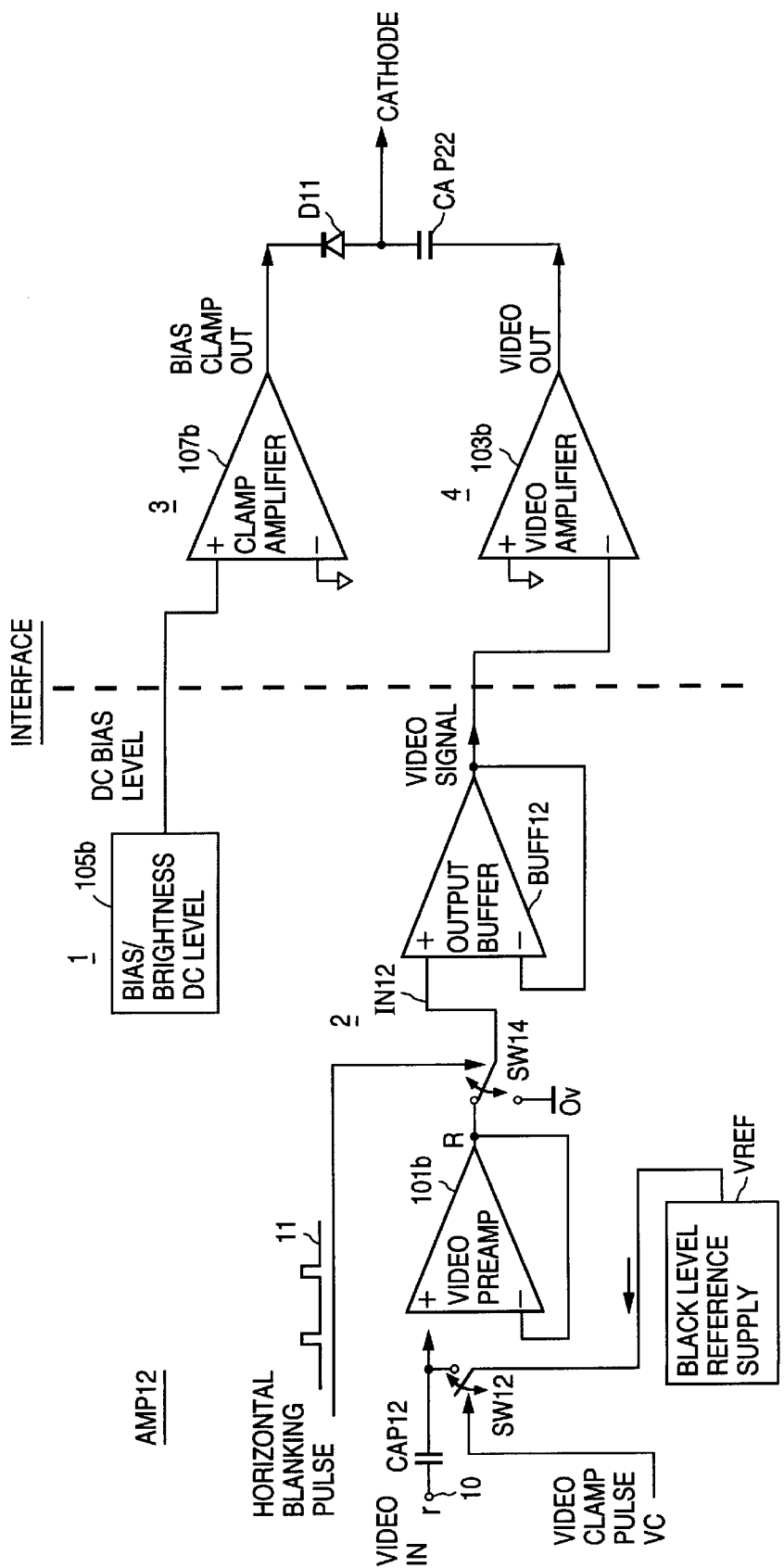
FIG. 2 illustrates a single channel of the conventional monitor amplifier circuit illustrated in FIG. 1.

There are several advantages to the multiplexed video interface system 300 as compared to conventional monitor amplifier system 100 (FIG. 1). First, conventional low pin count packages can be used, thus reducing the cost of the video channel components. For example, the clamp video 303b and the amplifier 307b and the video driver amplifier 313a can be contained within a conventional 15 pin IC package such as the TO220 IC package. Also, preamplifier circuit PREAMP may be packaged with other functions, such as, an on-screen display generator, a digital communication bus circuit, and digitally controlled digital-to-analog converter (DAC) circuits, and still be contained in a small footprint and low cost Dual In Line (DIL) package.

Another advantage of the multiplexed video interface system 300 is the reduction in the number of required IC connections, thus reducing the size and cost of the printed circuit boards (PCB). The smaller PCB size allows for closer connection of video preamplifier 301b to video amplifier 303b, thereby improving signal performance and reducing electromagnetic interference (EMI). EMI is further reduced because the video signal interface between preamplifier 301b and video amplifier 303b is approximately 12 decibels (dB) lower.

Finally, in one embodiment, the video amplifier 303b and clamp amplifier 307b are both differential amplifiers, and thus have good common mode noise rejection. In addition, the multiplexed interference signal is referenced to a stable and accurate voltage generated in the preamplifier. Thus, common mode noise and voltage variations in the system, such as the thermal drift or production variation that may occur in any of the circuits, are minimized.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a multiplexed video amplifier interface circuit, the multiplexed video amplifier circuit comprising:

a video preamplifier configured to receive an input video signal and in accordance therewith provide an output video signal;

a bias/brightness DC circuit configured to provide a bias signal;

a switching circuit configured to selectively couple to either said video preamplifier circuit or said bias/brightness DC circuit to receive said output video signal and said bias signal, and in accordance therewith provide a multiplexed video signal comprising said output video signal and said bias signal;

a clamp amplifier configured to receive said multiplexed video signal and a reference signal, wherein when said multiplexed video signal transcends said reference signal in a first direction, said clamp amplifier provides said bias signal to an external circuit; and a video amplifier configured to receive said multiplexed video signal and said reference signal, wherein when said multiplexed video signal transcends said reference signal in a second direction, said video amplifier provides said amplified video signal to said external circuit.

2. The apparatus of claim 1, wherein said video preamplifier and said bias/brightness circuit are provided on one integrated circuit.

3. The apparatus of claim 1, wherein said clamp amplifier and said video amplifier are provided on one integrated circuit.

4. The apparatus of claim 1, further comprising an output buffer circuit coupled between said switching circuit and said clamp and video amplifiers.

5. The apparatus of claim 1, further comprising a feedback amplifier circuit coupled to said video preamplifier circuit and configured to receive said output video signal and said reference signal, and in accordance therewith output a feedback signal to the video preamplifier circuit when said output video signal and said reference signal are unequal.

6. The apparatus of claim 1, wherein the switching circuit receives a horizontal blanking pulse having first and second signal states, and in accordance therewith selectively couples to said video preamplifier upon receiving the first signal state of the horizontal blanking pulse and selectively couples to said bias/brightness circuit upon receiving the second signal state of the horizontal blanking pulse.

7. The apparatus of claim 1, further comprising a shared reference voltage supply selectively coupled to an input of the video preamplifier, and coupled to an input of the clamp amplifier and an input of the video amplifier, wherein the shared reference voltage supply provides the reference signal.

8. The apparatus of claim 1, further comprising a second switching circuit coupled to an input of the video preamplifier and configured to receive a clamp pulse having first and second signal states, and in accordance therewith provide the reference signal to the input of the video preamplifier upon receiving a clamp pulse having the first signal state.

9. An apparatus including a multiplexed video interface circuit, the video amplifier circuit comprising:
a video preamplifier circuit having an input terminal, the video preamplifier configured to receive an input video signal at the input terminal and in accordance therewith provide an output video signal;
a capacitor coupled to the input terminal of the video preamplifier;
a first switching circuit coupled between the input terminal of the video preamplifier and a reference voltage supply and configured to receive a clamp pulse and in accordance therewith charge the capacitor with a reference voltage level from the reference voltage supply;
a bias/brightness circuit configured to provide a DC bias signal;
a second switching circuit configured to receive a horizontal blanking pulse having first and second signal states, and in accordance therewith couple to the video preamplifier circuit upon receiving the first signal state of the horizontal blanking pulse and couple to the bias/brightness circuit upon receiving the second signal state of the horizontal blanking pulse, wherein said second switching circuit provides a multiplexed video signal comprising said output video signal and said DC bias signal;
a clamp amplifier configured to receive said multiplexed video signal and a reference signal, and in accordance therewith provide said clamp signal to an external circuit when said multiplexed video signal transcends said reference signal in a first direction; and
a video amplifier configured to receive said multiplexed video signal and the reference signal and in accordance therewith provide said output video signal to said external circuit, when said multiplexed video signal transcends said reference signal in a second direction.

10. The apparatus of claim 9, wherein said video preamplifier circuit and said bias/brightness circuit are provided on one integrated circuit.

11. The apparatus of claim 9, wherein said clamp amplifier and said video amplifier are provided on one integrated circuit.

12. The apparatus of claim 9, further comprising an output buffer circuit coupled between said second switching circuit and said clamp and video amplifiers.

13. An apparatus including a multiplexed video amplifier interface circuit, the multiplexed video amplifier circuit comprising:
three video preamplifiers each configured to receive an input video signal and in accordance therewith provide an output video signal;
three bias/brightness circuits each configured to provide a bias signal;
three switching circuits each configured to selectively couple to either one of said video preamplifier circuits or one of said bias/brightness circuits to receive said output video signal and said bias signal, and in accordance therewith provide a multiplexed video signal comprising said output video signal and said bias signal;
three clamp amplifiers each configured to receive said multiplexed video signal and a reference signal, wherein when said multiplexed video signal transcends said reference signal in a first direction, said clamp amplifiers provide said bias signal to an external circuit; and
three video amplifiers each configured to receive said multiplexed video signal and said reference signal, wherein when said multiplexed video signal transcends said reference signal in a second direction, said video amplifiers provide said amplified video signal to said external circuit.

14. The apparatus of claim 13, wherein said three video preamplifiers, said three bias/brightness circuits and said three switching circuits are integrated into one circuit.

15. The apparatus of claim 14, further comprising three buffer amplifiers each of which couples between one of said switching circuits and both one of said video preamplifiers and one of said clamp amplifiers, wherein said three buffer circuits are integrated into said one circuit.

16. The apparatus of claim 13, wherein said three clamp amplifiers and said video amplifiers are integrated into one circuit.

17. The apparatus of claim 13, wherein said three video preamplifiers, said three bias/brightness circuits and said three switching circuits are integrated into one circuit, and said three clamp amplifiers and said video amplifiers are integrated into another circuit.

18. A method of providing an amplified video signal to a monitor circuit, the method comprising the steps of:
receiving a horizontal blanking pulse having first and second signal states, and in accordance therewith combining said amplified video signal and a DC bias signal to form a multiplexed video signal; and
receiving said multiplexed video signal and a reference signal, and in accordance therewith providing said DC bias signal to an external circuit when said multiplexed video signal transcends said reference signal in a first direction, and providing said amplified video signal to said external circuit when said multiplexed video signal transcends said reference signal in a second direction.

* * * * *